Dec. 26, 1939.  H. THÜRLINGS  2,184,405
APPARATUS FOR FILLING SOFT-CENTER CONFECTIONS AND THE LIKE
Original Filed Sept. 16, 1936
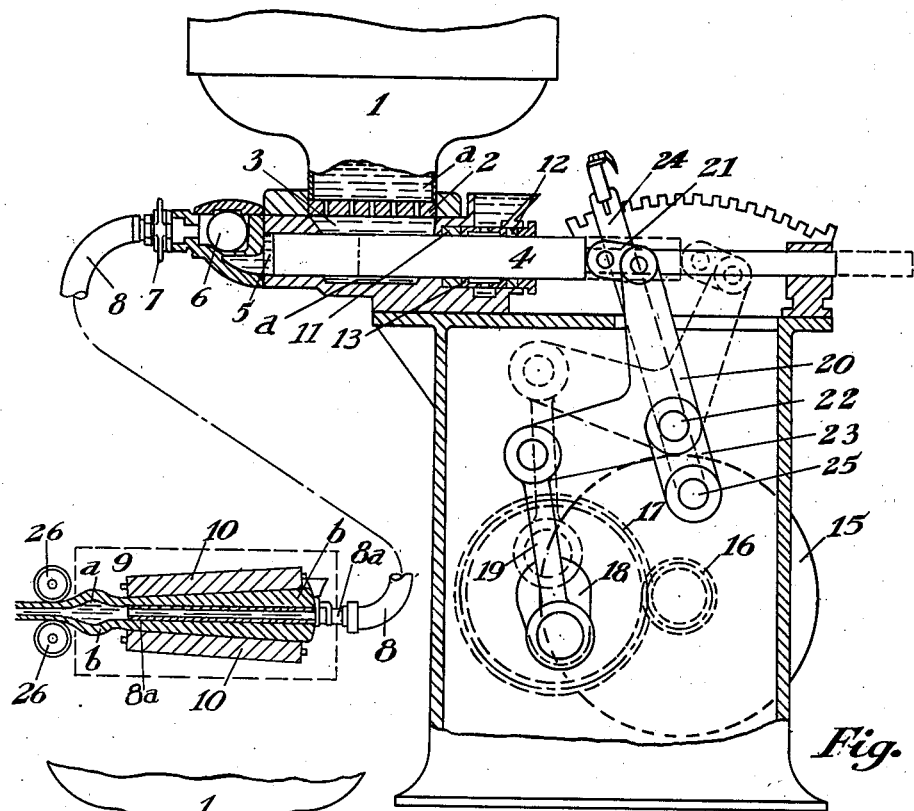
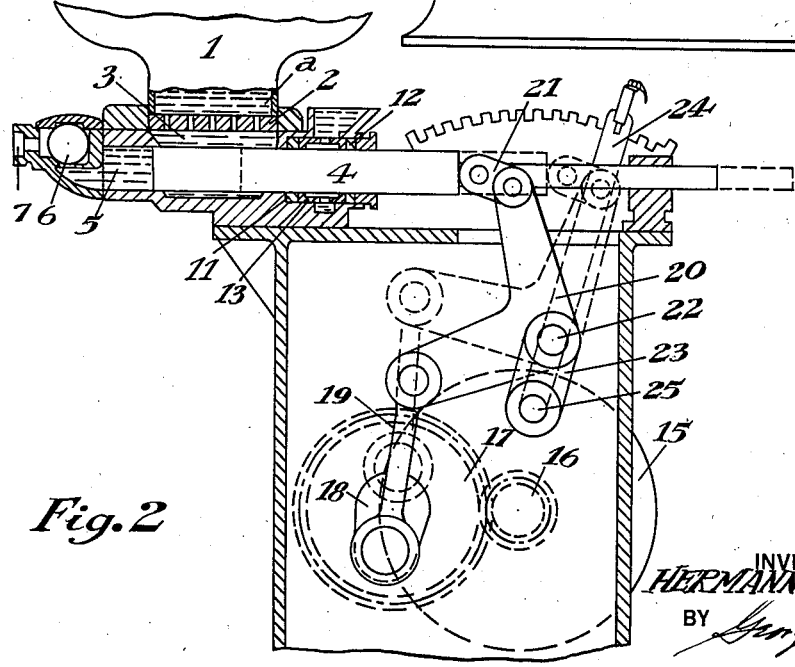
Fig. 1
Fig. 2
INVENTOR
HERMANN THÜRLINGS
BY
ATTORNEY Patented Dec. 26, 1939

2,184,405

UNITED STATES PATENT OFFICE 2,184,405

APPARATUS FOR FILLING SOFT-CENTER CONFECTIONS AND THE LIKE

Hermann Thürlings, Viersen, Germany, assignor to Baker Perkins Company, Inc., Saginaw, Mich., a corporation of New York Original application September 16, 1936, Serial No. 101,116. Divided and this application December 4, 1937, Serial No. 178,077. In Germany October 25, 1935

2 Claims. (Cl. 107—27)

This application, which is a division of my copending application for United States Letters Patent, Serial No. 101,116, filed September 16, 1936, and which matured June 14, 1938, into Patent No. 2,120,820, has to do with improved apparatus for the manufacture of soft-center filled confections, which are made in quantities by forming an endless tube of sugar, feeding the tube along an extruding nozzle, and simultaneously extruding filling material into the hollow center of the tube. The endless filled tube is subsequently cut into pieces and stamped in dies of various kinds, which operation presses closed the ends of the severed pieces of confections.

It has heretofore been considered essential, since the outer sugar tube was formed around and fed along an extruding nozzle at substantially uniform speed, that the filling also should be fed into the tube at a uniform rate; and the apparatus for feeding the filling material has been built to extrude it at a constant speed. Broadly, the filling machines consisted of a reservoir for the fluid or semi-fluid filling material, such as jam, cream, peanut butter, etc., from which reservoir the material was fed through the extruding tube into the sugar tube by gravity, fluid pressure, or a screw conveyor. These mechanisms were subject to certain disadvantages inherent in their method of operation. For example, the rate of feed could not readily be proportioned to filling of different consistencies, that is, to light and thin, as well as thick plastic materials. In handling thin liquid fillings the rate of feed was changed by adjusting the height of the supply reservoir, and, in the case of heavy filling materials requiring pressure for extrusion, the pressure on the fluid in the reservoir was varied. Also, in machines of this latter kind the supply reservoir could not be refilled without interrupting the feed by releasing the air pressure. Finally, machines employing feed screws were subject to mechanical difficulties caused by the crystallization of sugar on their working surfaces.

My invention eliminates the above-mentioned and other disadvantages of the apparatus heretofore used by the provision of improved mechanism new in the art, which operates in accordance with the method described in the copending application referred to above. This apparatus comprises a novel piston pump to feed the filling material especially suited to the characteristics of soft confection fillings, embodying novel means for adjusting the rate of feed of the filling material, and having other valuable features not present in the apparatus heretofore used.

Further objects and features of the invention will be apparent in the course of the following description.

In the accompanying drawing, in which like numerals designate like parts.

Fig. 1 is a part-diagrammatic sectional side elevation of a confection-extruding machine embodying the invention, showing the pump piston and its associated mechanism in adjusted position for delivering a large quantity of filling material.

Fig. 2 is a side elevation corresponding to Fig. 1, showing the extruding mechanism adjusted to deliver the smallest possible quantity of filling material.

Referring to the drawing, the apparatus shown consists of a supply hopper or reservoir 1, from which filling material a for the centers of candies is delivered through a protective grille 2 into a pump housing 3. Within the pump housing is a piston 4, centered for reciprocation in a cylinder 5. In its withdrawn position piston 4 is clear of the cylinder but is held clear of the walls of the housing 3 so that filling material can flow around it on all sides. Cylinder 5 communicates with the pump housing at its inner end and at its outer end is provided with a discharge check-valve 6. Connected to the discharge opening at valve 6, a coupling 7 conveys the filling from the pump into a tube 8 (see Fig. 1). Tube 8 is connected to an extruding tube or nozzle 8a in receptacle 9, shown diagrammatically in dotted lines, of a tube-forming device of known type. A plurality of rollers 10 are journaled in the receptacle 9 with their peripheral faces locating the surface of a cone. Rollers 10 are rotated (by means not shown) to mold the sugar or other material b around the tube 8a to receive and enclose the filling material a which is extruded from the tube, and form the hard outside shell of the finished product. Coating sugar b is placed in the receptacle 9, and in known manner is rolled and worked by rollers 10 into an endless tube enveloping the extruding nozzle 8a, which tube is progressively reduced in its outside diameter and urged endwise from the discharge end of the nozzle by the action of the rollers.

The piston 4 is packed by rings 11, 12 where it passes through the wall of the pump housing 3. Between the rings 11, 12, a peripherally grooved ring 13 is held. Above and around the stuffing box and communicating with the interior of ring 13 through drilled holes a water receptacle 14 is provided, adapted to permit water to flow gradually into the groove or ring 13 and onto the piston to wash away any sugar crystals which may be deposited from the filling material a.

The improved pump is driven from a belt pulley 15, power-driven by a motor (not shown), through spur gears 16, 17, a crank 18, a connecting rod 19, a bell crank lever 20, and a link 21 coupled to the piston. The pivot pin 22 of the bell crank 20 is mounted upon a lever 23. Lever 23 and a lever 24 fixed relative thereto are journaled on a fixed shaft 25. By shifting the lever 24, the position of pivot 22 can be adjusted so that the distance which the piston 4 travels into the cylinder 5 can be altered, thus varying the effective stroke of the piston and accordingly changing the rate at which filling material is fed to the tube 8. Fig. 1 shows the drive mechanism set for the maximum stroke of the piston and the greatest delivery of filled material, while Fig. 2 shows the pivot 22 adjusted for a minimum rate of delivery, the frequency of the pump reciprocation being the same for both settings.

The pump described embodies several novel features, by which are overcome the difficulties commonly encountered in pumping super-saturated sugar syrups. The friction of a piston stuffing box ordinarily causes crystallization in such a solution, and these crystals accumulate on the pump piston, eventually causing the piston to stick. By continually supplying water to the ring 13 from reservoir 14 the piston is caused to pass at each stroke through a water bath which dissolves any crystals in process of formation.

A further objection to the usual type of pump for handling sugar solution or any other plastic material, such as jam or marmalades, is that when handling small quantities the conventional suction-actuated intake valve often sticks, or at best works only very irregularly. My improved pump has no such small suction valve. The piston 4 is withdrawn completely from cylinder 5 at each stroke, opening the full cylinder section to the entrance of filling material. The vacuum produced by the withdrawal of the piston and retained by the seating of ball check valve 6 insures that the heaviest material will flow readily into the cylinder.

In operation the outer tube b of coating sugar receives filling material intermittently with each stroke of the piston. Consequently the speed and stroke of the pump are adjusted so that its average delivery is appropriate to the internal diameter of the outer sugar tube b and the rate of feed of that tube from the discharge end of the extrusion nozzle 8a. The filled sugar tube as it leaves the receptacle 9 presents a succession of nodes or sections which have been overfilled, alternately with empty or slack-filled sections. The elasticity of the outer sugar tube may be sufficient to equalize the bulges partly or entirely, or if desired, pressure means for reducing the nodes may be employed. For example, a plurality of rollers 26, journaled transversely of the material, may be located at a short distance beyond the point of delivery of the filled tube from receptacle 9, as shown in Fig. 1. Rollers 26 work the bulged sections down to the desired diameter, forcing the excess filling into the unfilled portions of the tube, and producing a filled tube of uniform diameter ready for cutting and stamping into finished pieces.

While I have shown and described a machine for the making of confections, it may also be used advantageously in the handling of other plastic materials, such as rubber, wax, or gum. The terms "confection" and "sugar" are here intended to include such other materials, and the machine may be modified in various details to adapt it for handling them without departing from the spirit of the invention and the scope of the appended claims.

Having thus described my invention, what I claim and desire to secure by Letters Patent is:

1. Apparatus for extruding viscous, plastic, or fluid material comprising in combination, a source of said material, a cylinder open at its rearward end to communicate with said source and communicating with an extruding orifice at its forward end, a piston mounted for reciprocation in said cylinder and arranged to withdraw from the cylinder on its rearward stroke, whereby on the withdrawal of said piston the cylinder is opened to access of material and during its forward stroke the piston functions as a valve to cut off the cylinder from said supply, means for imparting reciprocatory motion to said piston, and means for varying the depth to which the piston enters the cylinder to vary the amount of material extruded.

2. Apparatus as claimed in claim 1, wherein the means for reciprocating the piston includes a bell-crank operatively connecting the piston and a source of reciprocatory motion, said crank rotatably mounted on a pivot which is shiftable laterally, and adjusting means is provided for shifting said pivot to vary the travel of the piston in the cylinder.

HERMANN THÜRLINGS.